(12) United States Patent
Lin et al.

(10) Patent No.: US 8,861,514 B1
(45) Date of Patent: Oct. 14, 2014

(54) METHOD AND APPARATUS FOR EGRESS JITTER PACER

(75) Inventors: Alex Lin, Saratoga, CA (US); Raghu Kondapalli, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 521 days.

(21) Appl. No.: 12/240,235

(22) Filed: Sep. 29, 2008

Related U.S. Application Data

(60) Provisional application No. 60/975,633, filed on Sep. 27, 2007.

(51) Int. Cl.
*H04L 12/26* (2006.01)
*H04L 12/50* (2006.01)

(52) U.S. Cl.
USPC .......................... 370/376; 370/230; 370/235

(58) Field of Classification Search
USPC .................................. 370/301, 445
See application file for complete search history.

(56) References Cited

U.S. PATENT DOCUMENTS

| | | | |
|---|---|---|---|
| 6,477,144 B1 * | 11/2002 | Morris et al. ............... | 370/230.1 |
| 7,082,472 B1 * | 7/2006 | Feder et al. .................... | 709/235 |
| 7,324,554 B1 * | 1/2008 | Ginjpalli et al. .............. | 370/468 |
| 7,415,477 B2 * | 8/2008 | Devadas et al. ....................... | 1/1 |
| 8,705,552 B1 * | 4/2014 | Lin ............................... | 370/428 |
| 2002/0114277 A1 * | 8/2002 | Kyusojin .................... | 370/230.1 |
| 2003/0185155 A1 * | 10/2003 | Huang et al. .................. | 370/235 |
| 2003/0202517 A1 * | 10/2003 | Kobayakawa et al. ..... | 370/395.4 |
| 2003/0223444 A1 * | 12/2003 | Lambrecht ..................... | 370/412 |
| 2004/0136396 A1 * | 7/2004 | Yonge et al. .................. | 370/445 |
| 2004/0163084 A1 * | 8/2004 | Devadas et al. ............... | 718/103 |
| 2004/0210619 A1 * | 10/2004 | Balachandran et al. ...... | 709/200 |
| 2005/0141567 A1 * | 6/2005 | Jaber et al. ..................... | 370/537 |
| 2005/0207419 A1 * | 9/2005 | Kohzuki et al. ............... | 370/392 |
| 2006/0087969 A1 * | 4/2006 | Santiago et al. .............. | 370/229 |
| 2006/0274779 A1 * | 12/2006 | Shoham ........................ | 370/450 |
| 2007/0121504 A1 * | 5/2007 | Hellenthal et al. ............ | 370/230 |
| 2007/0153697 A1 * | 7/2007 | Kwan et al. .................... | 370/235 |
| 2007/0165647 A1 * | 7/2007 | Kenney et al. ............. | 370/395.4 |
| 2007/0189163 A1 * | 8/2007 | Ozawa ......................... | 370/230 |
| 2007/0258370 A1 * | 11/2007 | Kondapalli ................... | 370/234 |
| 2007/0282492 A1 * | 12/2007 | Valovage et al. .................. | 701/3 |
| 2008/0123682 A1 * | 5/2008 | Yackoski et al. ............. | 370/443 |
| 2008/0279554 A1 * | 11/2008 | Kazawa et al. ................. | 398/69 |
| 2014/0010082 A1 * | 1/2014 | Sarkar ........................... | 370/230 |

* cited by examiner

Primary Examiner — Marsha D Banks Harold
Assistant Examiner — Christopher Wyllie

(57) ABSTRACT

A network switch includes a first queue that receives a first packet. A second queue receives a second packet. A queue control module determines a desired output time slot of the first packet based on an arrival time and an output rate associated with the first packet, determines a length and a scheduled output time slot of the second packet, and selectively outputs the first packet before the second packet based on the desired output time slot, the length, and the scheduled output time slot.

2 Claims, 9 Drawing Sheets

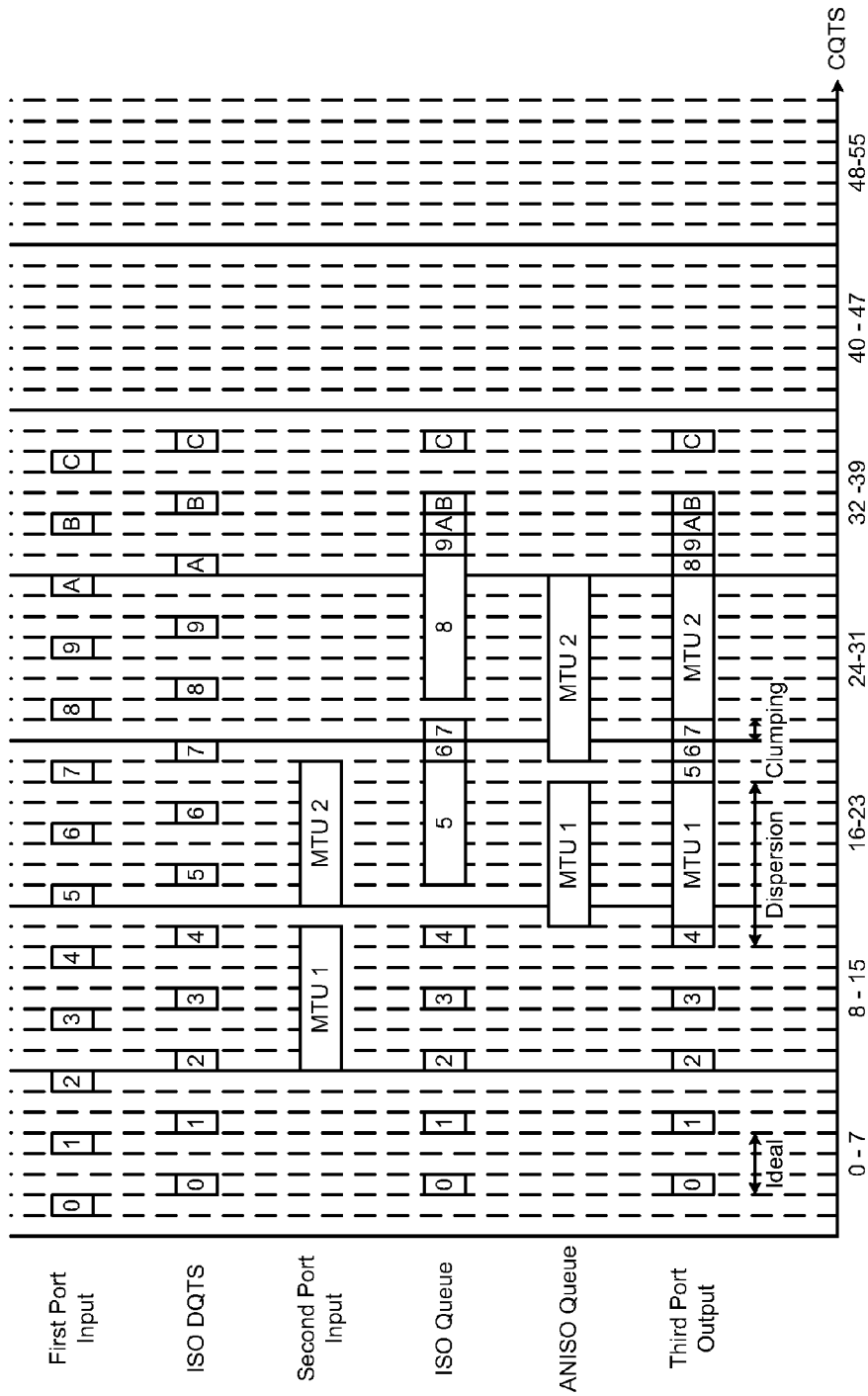

METHOD AND APPARATUS FOR EGRESS JITTER PACER

CROSS-REFERENCE TO RELATED APPLICATIONS

This application claims the benefit of U.S. Provisional Application No. 60/975,633, filed on Sep. 27, 2007. The disclosure of the above application is incorporated herein by reference in its entirety.

FIELD

The present disclosure relates to network switches and more particularly to packet scheduling in network switches.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A local area network (LAN) may include a network switch that forwards packets (i.e., formatted blocks of data) between ports of the LAN. The packets are forwarded based on Media Access Control (MAC) addresses and/or Internet Protocol (IP) addresses of the ports in the packets. The network switch includes a plurality of ports that are connected to other ports of the LAN.

Traditional network switches schedule the forwarding of packets once the packets are available, or received. Scheduling the forwarding of packets based on the availability of the packets, however, may increase latency and jitter (i.e., variation in latency) in forwarding packets of streaming audio and/or video (i.e., media). The increase in latency and jitter occurs when packets of streaming media aggregate on an output port with packets of different sizes. The packets of streaming media are required to be forwarded at equal time intervals to serve the media seamlessly. Accordingly, the increase in latency and/or jitter is not desired.

SUMMARY

A network switch includes a first queue that receives a first packet. A second queue receives a second packet. A queue control module determines a desired output time slot of the first packet based on an arrival time and an output rate associated with the first packet, determines a length and a scheduled output time slot of the second packet, and selectively outputs the first packet before the second packet based on the desired output time slot, the length, and the scheduled output time slot.

In other features, the first packet is associated with a first class of service and the second packet is associated with a second class of service. The queue control module determines the scheduled output time slot based on a byte count of the second packet and an output rate associated with the second packet. The queue control module increases a first token count associated with the first packet by a token count of the first packet when the queue control module outputs the first packet and increases a second token count associated with the second packet by a token count of the second packet when the queue control module outputs the second packet. The queue control module determines the token count of the first packet based on a byte count of the first packet and a predetermined byte count per token and determines the token count of the second packet based on a byte count of the second packet and the predetermined byte count per token. The queue control module decreases the first token count by a predetermined token count per time period associated with the first packet after the time period and decreases the second token count by a predetermined token count per second time period associated with the second packet after the second time period.

In other features, the queue control module outputs the first packet when the first token count is less than or equal to a predetermined token count threshold and outputs the second packet when the second token count is less than or equal to the predetermined token count threshold. The queue control module outputs the first packet when the first token count is less than or equal to a first token limit associated with the first packet and outputs the second packet when the second token count is less than or equal to a second token limit associated with the second packet. The queue control module determines the first token limit based on a first output time period of the first packet and the token count per time period associated with the first packet and determines the second token limit based on a second output time period of the second packet and the token count per time period associated with the second packet.

A method for operating a network switch includes receiving a first packet at a first queue, receiving a second packet at a second queue, determining a desired output time slot of the first packet based on an arrival time and an output rate associated with the first packet, determining a length and a scheduled output time slot of the second packet, and selectively outputting the first packet before the second packet based on the desired output time slot, the length, and the scheduled output time slot.

In other features, the first packet is associated with a first class of service and the second packet is associated with a second class of service. Determining the scheduled output time slot includes determining the scheduled output time slot based on a byte count of the second packet and an output rate associated with the second packet. The method further includes increasing a first token count associated with the first packet by a token count of the first packet when the queue control module outputs the first packet, and increasing a second token count associated with the second packet by a token count of the second packet when the queue control module outputs the second packet.

In other features, the method further includes determining the token count of the first packet based on a byte count of the first packet and a predetermined byte count per token, and determining the token count of the second packet based on a byte count of the second packet and the predetermined byte count per token. The method further includes decreasing the first token count by a predetermined token count per time period associated with the first packet after the time period, and decreasing the second token count by a predetermined token count per second time period associated with the second packet after the second time period.

In other features, the method further includes outputting the first packet when the first token count is less than or equal to a predetermined token count threshold, and outputting the second packet when the second token count is less than or equal to the predetermined token count threshold. The method of further includes outputting the first packet when the first token count is less than or equal to a first token limit associated with the first packet, and outputting the second packet when the second token count is less than or equal to a second token limit associated with the second packet. The method further includes determining the first token limit based on a first output time period of the first packet and the token count per time period associated with the first packet, and determining the second token limit based on a second output time period of the second packet and the token count per time period associated with the second packet.

A network switch includes first queue means for receiving a first packet and second queue means for receiving a second packet. The network switch includes queue control means for determining a desired output time slot of the first packet based on an arrival time and an output rate associated with the first packet, for determining a length and a scheduled output time slot of the second packet, and for selectively outputting the first packet before the second packet based on the desired output time slot, the length, and the scheduled output time slot.

In other features, the first packet is associated with a first class of service and the second packet is associated with a second class of service. The queue control means determines the scheduled output time slot based on a byte count of the second packet and an output rate associated with the second packet. The queue control means increases a first token count associated with the first packet by a token count of the first packet when the queue control means outputs the first packet and increases a second token count associated with the second packet by a token count of the second packet when the queue control means outputs the second packet. The queue control means determines the token count of the first packet based on a byte count of the first packet and a predetermined byte count per token and determines the token count of the second packet based on a byte count of the second packet and the predetermined byte count per token. The queue control means decreases the first token count by a predetermined token count per time period associated with the first packet after the time period and decreases the second token count by a predetermined token count per second time period associated with the second packet after the second time period.

In other features, the queue control means outputs the first packet when the first token count is less than or equal to a predetermined token count threshold and outputs the second packet when the second token count is less than or equal to the predetermined token count threshold. The queue control means outputs the first packet when the first token count is less than or equal to a first token limit associated with the first packet and outputs the second packet when the second token count is less than or equal to a second token limit associated with the second packet. The queue control means determines the first token limit based on a first output time period of the first packet and the token count per time period associated with the first packet and determines the second token limit based on a second output time period of the second packet and the token count per time period associated with the second packet.

A computer program stored on a computer-readable medium for use by a processor for operating a network switch includes receiving a first packet at a first queue, receiving a second packet at a second queue, determining a desired output time slot of the first packet based on an arrival time and an output rate associated with the first packet, determining a length and a scheduled output time slot of the second packet, and selectively outputting the first packet before the second packet based on the desired output time slot, the length, and the scheduled output time slot.

In other features, the first packet is associated with a first class of service and the second packet is associated with a second class of service. Determining the scheduled output time slot includes determining the scheduled output time slot based on a byte count of the second packet and an output rate associated with the second packet. The computer program further includes increasing a first token count associated with the first packet by a token count of the first packet when the queue control module outputs the first packet, and increasing a second token count associated with the second packet by a token count of the second packet when the queue control module outputs the second packet.

In other features, the computer program further includes determining the token count of the first packet based on a byte count of the first packet and a predetermined byte count per token, and determining the token count of the second packet based on a byte count of the second packet and the predetermined byte count per token. The computer program further includes decreasing the first token count by a predetermined token count per time period associated with the first packet after the time period, and decreasing the second token count by a predetermined token count per second time period associated with the second packet after the second time period.

In other features, the computer program further includes outputting the first packet when the first token count is less than or equal to a predetermined token count threshold, and outputting the second packet when the second token count is less than or equal to the predetermined token count threshold. The computer program of further includes outputting the first packet when the first token count is less than or equal to a first token limit associated with the first packet, and outputting the second packet when the second token count is less than or equal to a second token limit associated with the second packet. The computer program further includes determining the first token limit based on a first output time period of the first packet and the token count per time period associated with the first packet, and determining the second token limit based on a second output time period of the second packet and the token count per time period associated with the second packet.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

Figure 5:
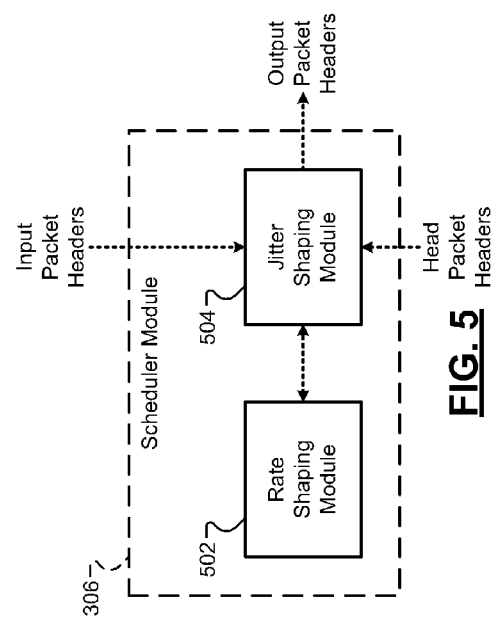
Figure 6:
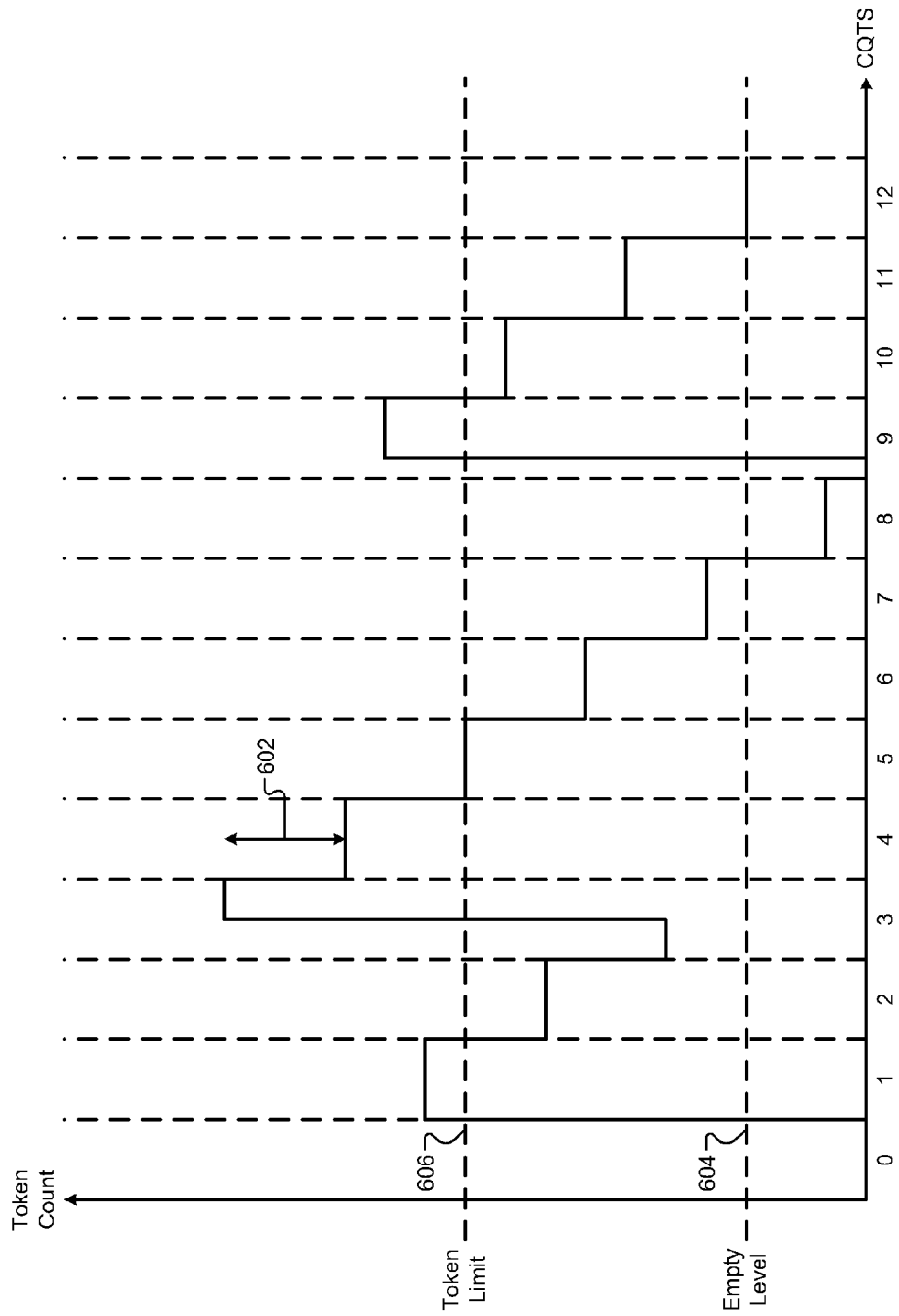
Figure 7:
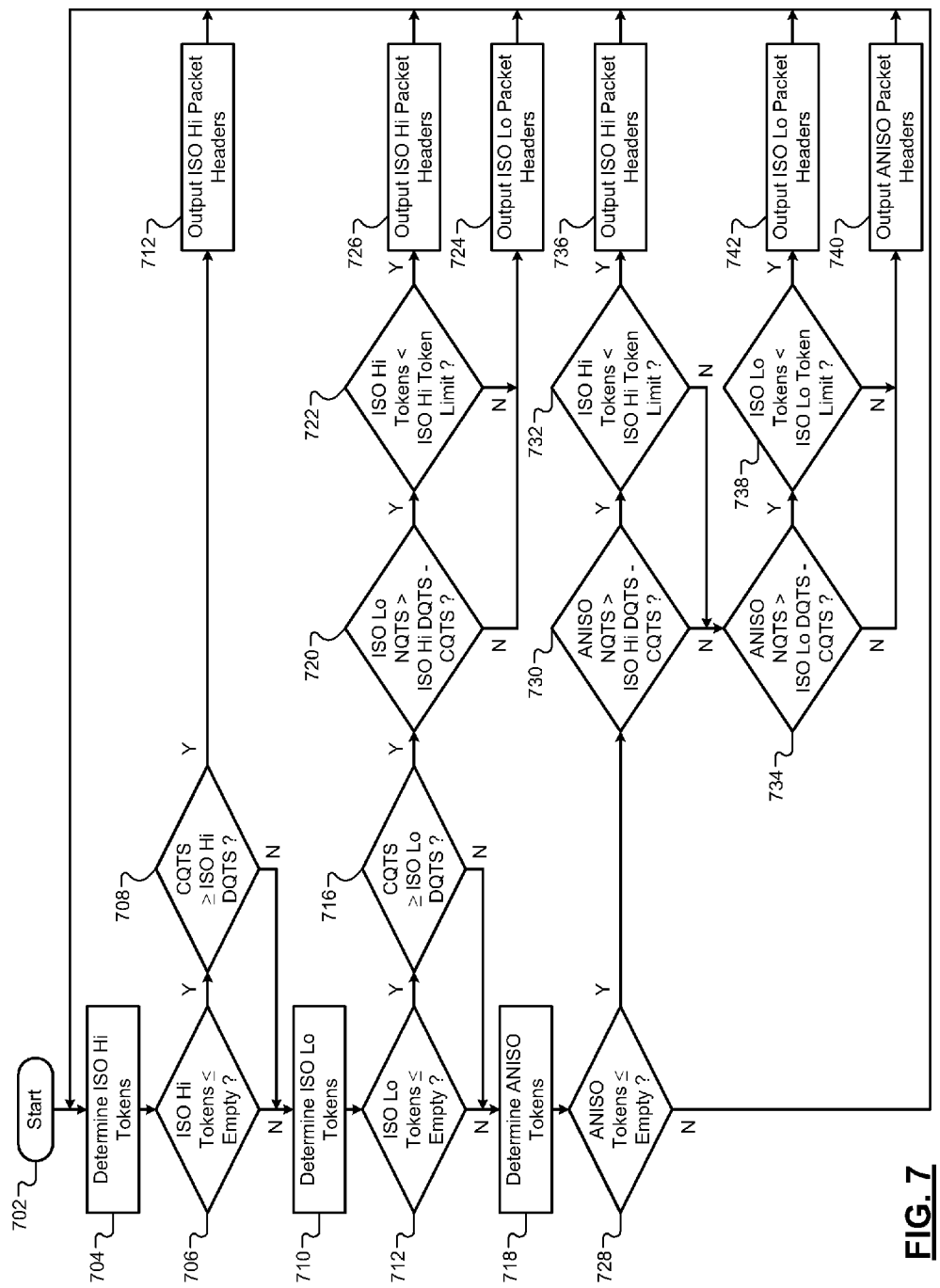
Figure 8B:
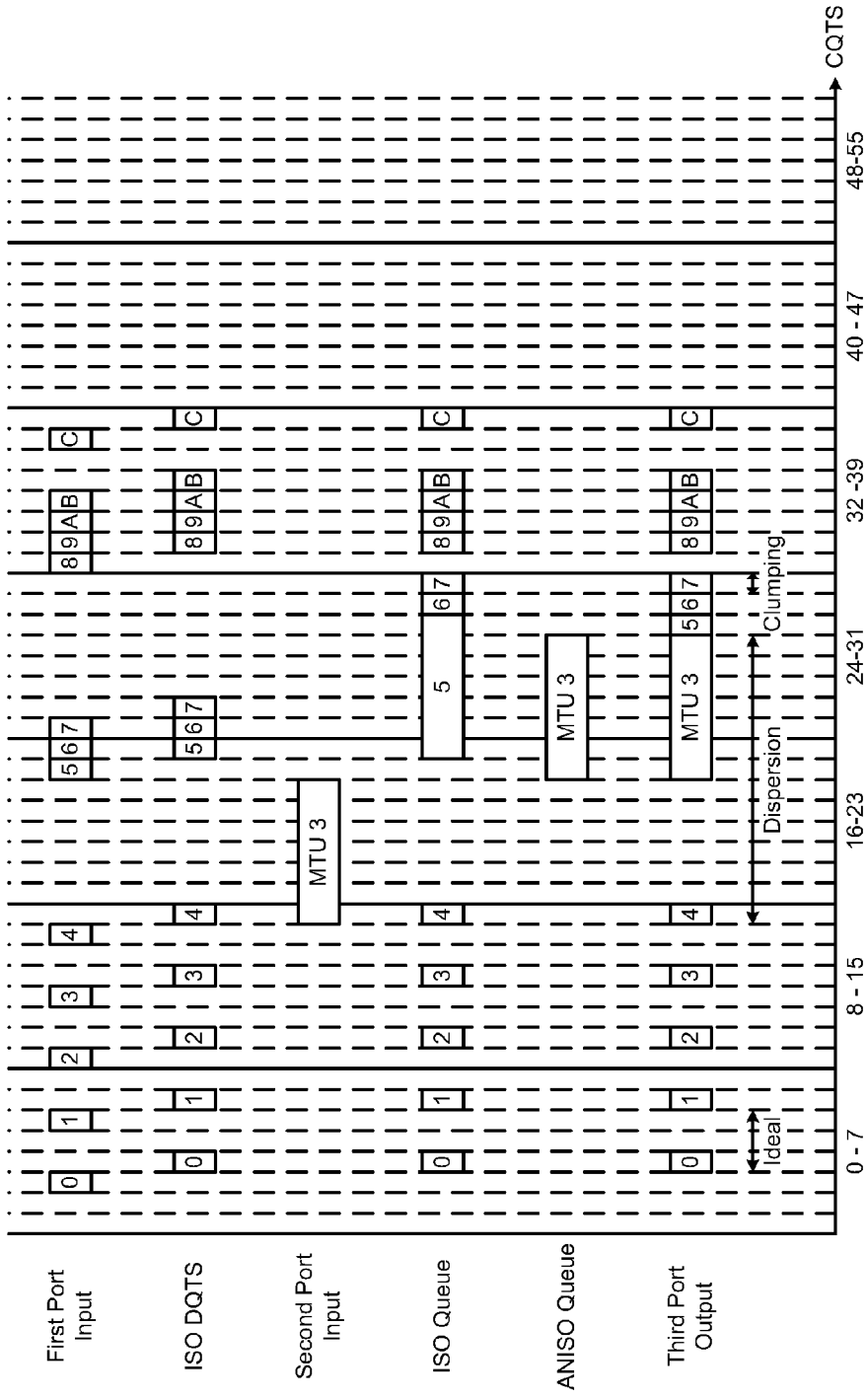
Figure 9A:
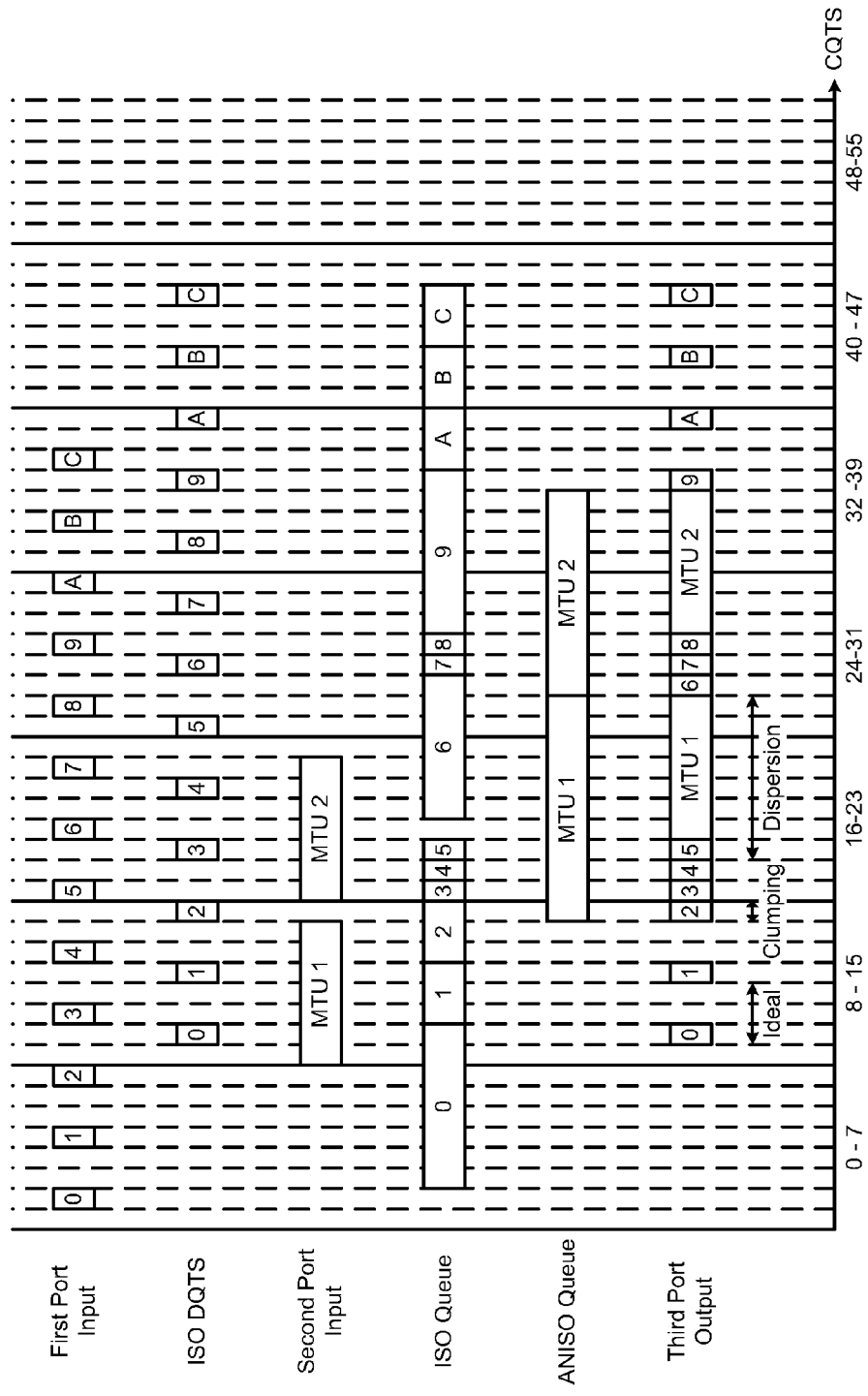
Figure 9B:
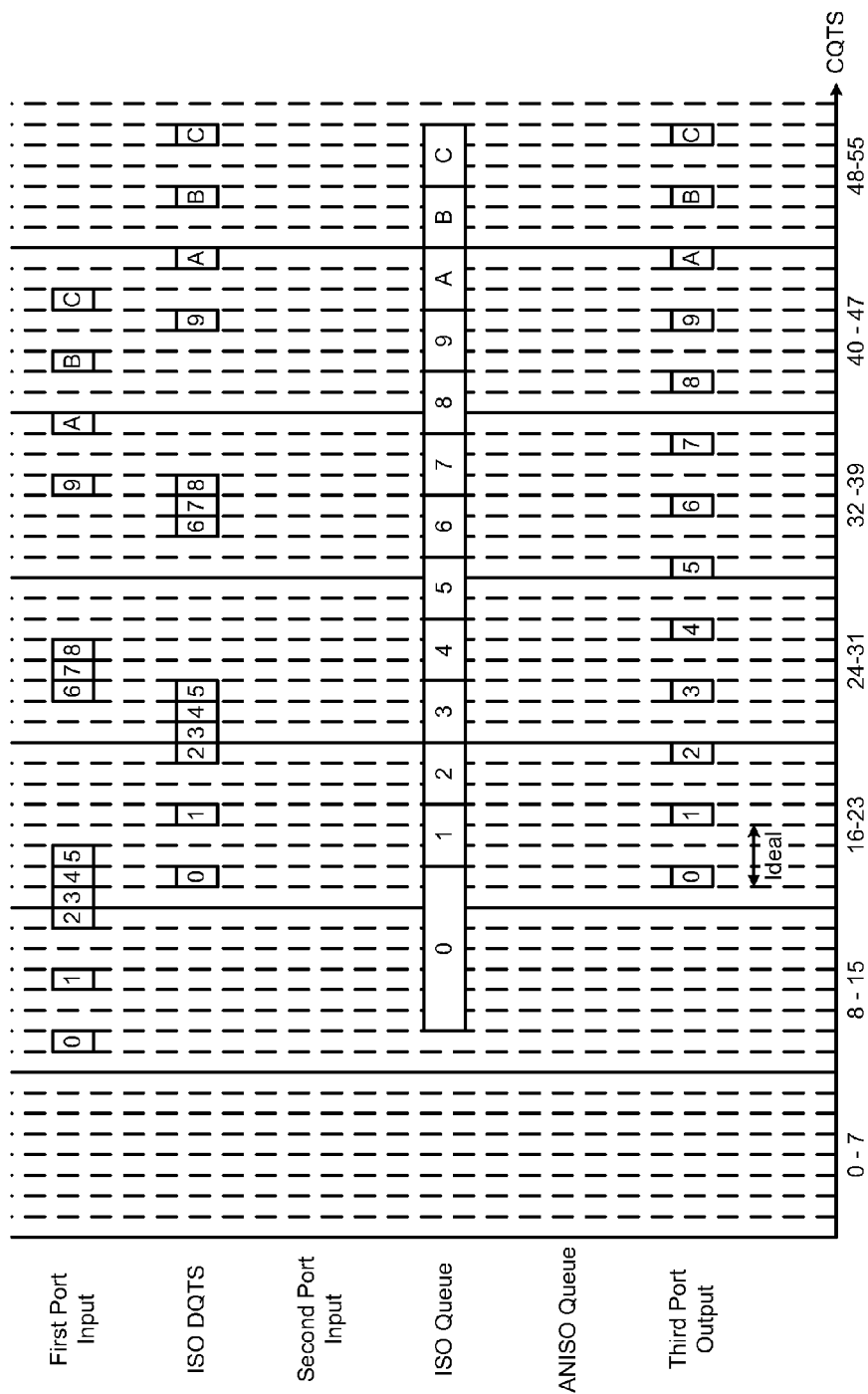

class, an ISO low-priority (Lo) class, and an anisochronous (ANISO) class according to the principles of the present disclosure;

FIG. 5 is a functional block diagram of an exemplary implementation of a scheduler module according to the principles of the present disclosure;

FIG. 6 is a graph depicting a token count of a leaky bucket of a class of packet sequences versus a current time slot of the queue control module (CQTS) according to the principles of the present disclosure;

FIG. 7 is a flowchart depicting exemplary steps performed by the scheduler module according to the principles of the present disclosure;

FIG. 8A is a timing diagram depicting exemplary packet sequences between ports and queues of a network switch of a first hop according to the principles of the prior art;

FIG. 8B is a timing diagram depicting exemplary packet sequences between ports and queues of a network switch of a second hop according to the principles of the prior art;

FIG. 9A is a timing diagram depicting exemplary packet sequences between ports and queues of a network switch of a first hop according to the principles of the present disclosure; and FIG. 9B is a timing diagram depicting exemplary packet sequences between ports and queues of a network switch of a second hop according to the principles of the present disclosure.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The network switch of the present disclosure decreases latency and jitter in forwarding packets of streaming media. The network switch may delay the availability of the packets and output the packets before they become available if outputting other types of packets would increase the latency and jitter. The network switch outputs the packets at a predetermined rate to further decrease jitter.

Figure 1:
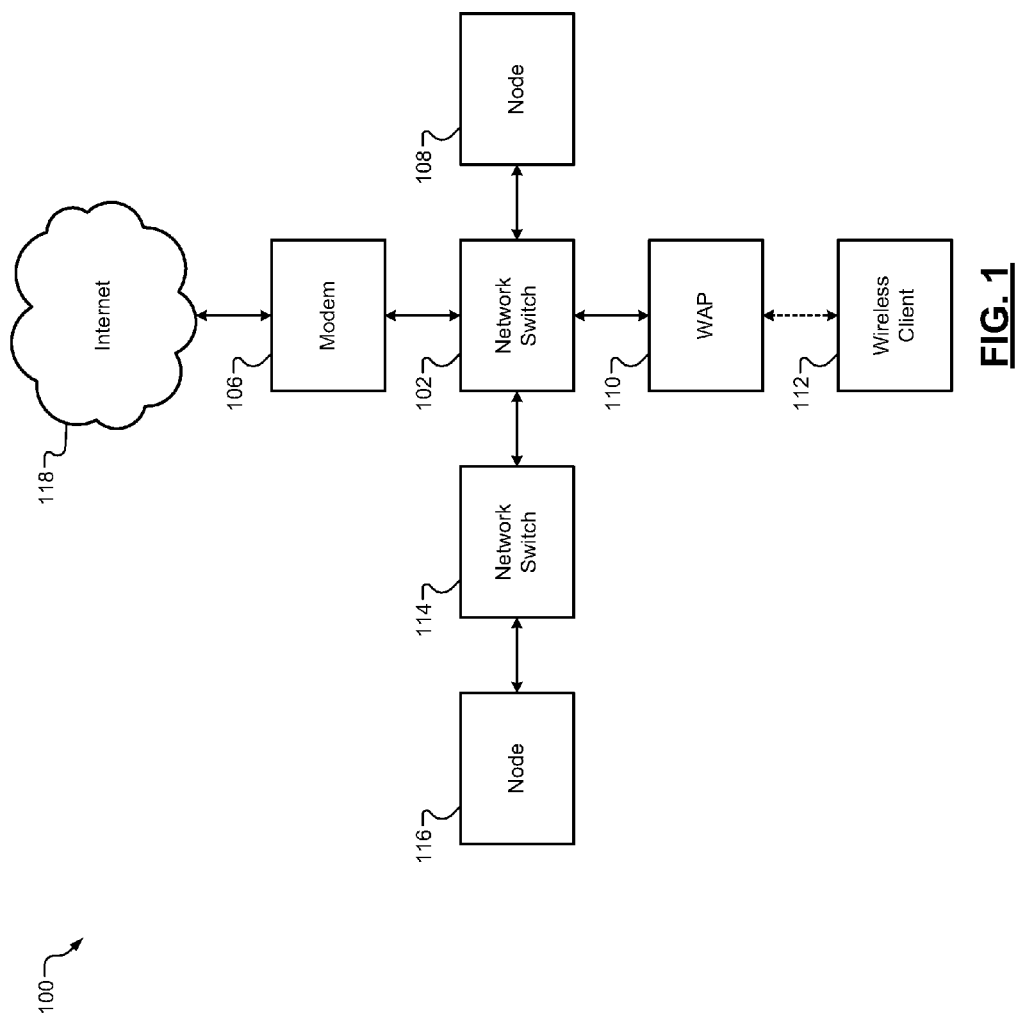
FIG. 1 is a functional block diagram of an exemplary implementation of a local area network (LAN) according to the principles of the present disclosure.

Referring now to FIG. 1, a functional block diagram of a local area network (LAN) 100 that may include one or more wireless devices is shown. The network 100 includes a router or network switch 102, a modem 106, a node 108, a wireless access point (WAP) 110, one or more wireless clients 112, a network switch 114, and a node 116. The network switch 102 forwards and filters packets between ports in the network 100 based on Media Access Control (MAC) addresses and/or Internet Protocol (IP) addresses of the ports in the packets. The network switch 102 includes a plurality of ports (not shown) that are connected to other ports in the network 100.

The network switch 102 transmits the packets between the modem 106, the node 108, the WAP 110, and the network switch 114 based on packet headers and forwarding tables to determine the best path for forwarding the packets. In other words, the network switch 102 may transmit the packets directly to a node, to a node via another network switch, or to a node (i.e. a wireless client) via a WAP. The network switch 102 is connected to a distributed network such as the Internet 118 via the modem 106. The modem 106 receives and converts the packets to analog signals and modulates the signals for transfer to another network. The modem 106 converts analog signals from another network to digital packets and demodulates the packets for use in the network 100.

The node 108 includes a port (not shown) that is connected to the network switch 102. For example only, the node 108 may include a personal computer (PC), a personal digital assistant (PDA), a Voice-over-Internet Protocol (VoIP) phone, and/or another network switch or router. The WAP 110 may include a port (not shown) that is connected to the network switch 102. The WAP 110 allows the wireless client 112 and other wireless clients to connect to the network 100 via transmitting and receiving radio frequency (RF) signals. For example only, the wireless client 112 may include a PC (i.e., a laptop), a PDA, and/or a VoIP phone.

In various implementations, the network switch 102, the modem 106, and/or the WAP 110 may be included in a converged device (not shown). For example only, a wireless device such as a router may include the network switch 102 and the WAP 110. The network switch 114 includes a port (not shown) that is connected to the network switch 102 and includes at least one port that is connected to another port in the network 100. The node 1116 includes a port (not shown) that is connected to the network switch 114.

A hop is a step from one device of the network 100 to another device of the network 100 on a path of a packet in the network 100. For example, a first hop may be a step from the node 108 to the network switch 102 on a path of a packet from the node 108 to the node 116. A second hop may be a step from the network switch 102 to the network switch 114 on the path of the packet from the node 108 to the node 116.

Figure 2:
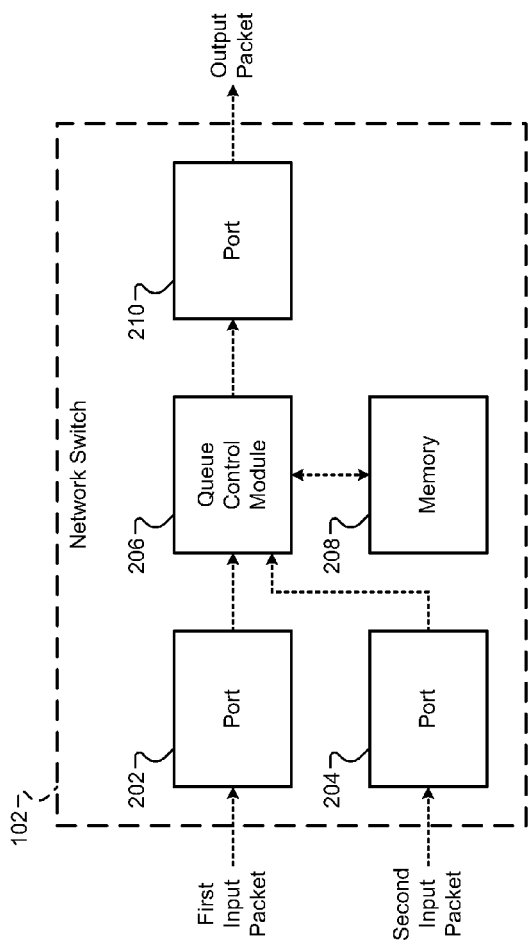
FIG. 2 is a functional block diagram of an exemplary implementation of a network switch according to the principles of the present disclosure.

Referring now to FIG. 2, a functional block diagram of the network switch 102 is shown. The network switch 102 includes a port 202, a port 204, a queue control module 206, memory 208, and a port 210. The port 202 receives a first input packet and transfers the first input packet to the queue control module 206. The port 204 receives a second input packet and transfers the second input packet to the queue control module 206.

As can be appreciated, the first and the second input packets may each be in a packet sequence of one of various classes. For exemplary purposes, the classes will be discussed to include an ISO high-priority (Hi) class, an ISO low-priority (Lo) class, and an anisochronous (ANISO) class. For example only, an ANISO Hi class, an ANISO Lo class, and other classes of packet sequences are contemplated.

Packets in a packet sequence of an ISO class may be synchronized to be transmitted at equal time intervals, and thus, the ISO class includes a latency limit (e.g., 2 ms across 7 hops and 285 µs at each hop) and jitter (i.e., variation in delay of a packet to the next packet) limit. For example only, streaming media may be transmitted as packet sequences of the ISO class. In contrast, the ANISO class does not include the latency and jitter limits, and for example only, e-mail may be transmitted as packet sequences of the ANISO class.

For example, only, a Hi class may include a larger class time slot (CTS) than a Lo class. The CTS is a predetermined observation time interval for a packet sequence of a class. For example only, the ISO Hi class may include a CTS of 125 µs, while the ISO Lo class may include a CTS of 1 ms.

The queue control module 206 receives the first and the second input packets and determines a class of each of the input packets. The queue control module 206 determines headers of each of the input packets based on the class of each of the input packets. The headers of each of the input packets include at least a pointer, a byte count, and a departure queue time slot (DQTS) of each of the input packets as described herein.

A queue time slot (QTS) is an observation time interval for the queue control module 206. For example only, the CTS of the ISO Hi class (e.g., 125 µs) may be divisible by the QTS (e.g., 12.5 µs). The QTS may be predetermined in the queue control module 206 or determined by another module (not shown).

A current QTS (CQTS) is initialized to zero and is incremented at each QTS interval by the queue control module 206. A DQTS of an input packet is the CQTS in which the input packet is initially scheduled to be output by the network switch 102. The queue control module 206 determines the DQTS by summing the CQTS when the queue control module 206 receives the input packet and a QTS delay QTSD. For example only, the QTSD may correspond to a predetermined number of QTS that the input packet is delayed. For example only, the QTSD may be equal to 10 QTS.

The queue control module 206 stores the first and the second input packets and their headers in associated queues (not shown) of the memory 208. For example, when one of the first and the second input packets is determined to be of the ISO Hi class, the input packet and its headers are stored in an ISO Hi queue of the memory 208. The memory 208 may further include an ISO Lo queue, an ANISO queue, and other queues.

The queue control module 206 retrieves headers of head (i.e., first) packets for each of the queues of the memory 208. The queue control module 206 schedules one of the head packets to be retrieved from the memory 208 and to be output (i.e., determines an output packet). The output packet is determined based on the headers of the head packets. The port 210 receives the output packet and outputs the output packet to another device of the network 100.

Figure 3:
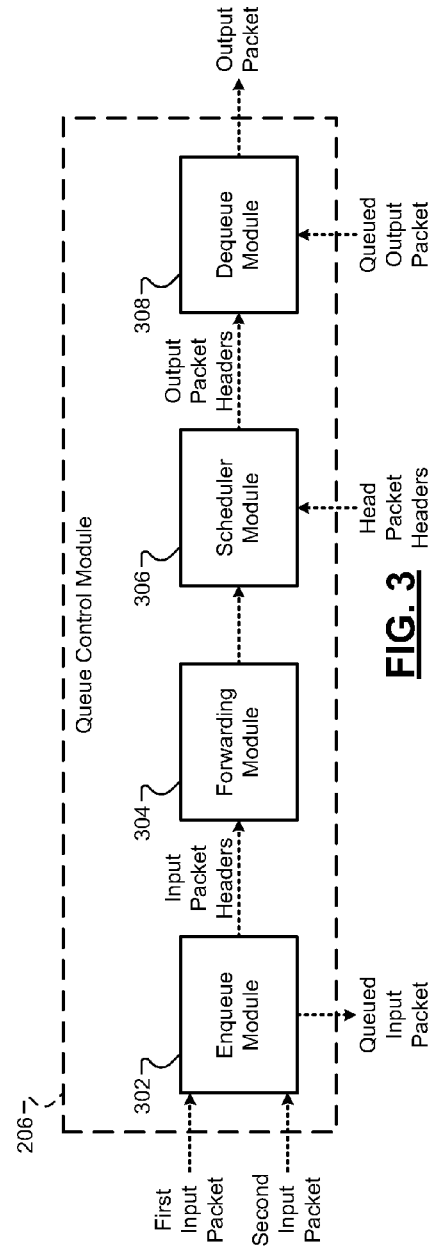
FIG. 3 is a functional block diagram of an exemplary implementation of a queue control module according to the principles of the present disclosure.

Referring now to FIG. 3, a functional block diagram of an exemplary implementation of the queue control module 206 is shown. The queue control module 206 includes an enqueue module 302, a forwarding module 304, a scheduler module 306, and a dequeue module 308. The enqueue module 302 receives the first and the second input packets.

The enqueue module 302 determines the class of each of the first and the second input packets. The enqueue module 302 determines the headers of each of the input packets (i.e., input packet headers) based on the class of each of the input packets. The enqueue module 302 stores a queued input packet into the associated queue of the memory 208 based on the headers.

The forwarding module 304 receives the input packet headers and forwards the input packet headers to the scheduler module 306. The scheduler module 306 receives the input packet headers and retrieves the headers of the head packets in the queues of the memory 208 (i.e., head packet headers). The scheduler module 306 determines headers of the output packet (i.e., output packet headers) based on the input packet headers and the head packet headers. The dequeue module 308 receives the output packet headers and retrieves a queued output packet from the associated queue of the memory 208 based on the pointer of the output packet headers. The dequeue module 308 determines the output packet based on the queued output packet and outputs the output packet to another device of the network 100.

Figure 4:
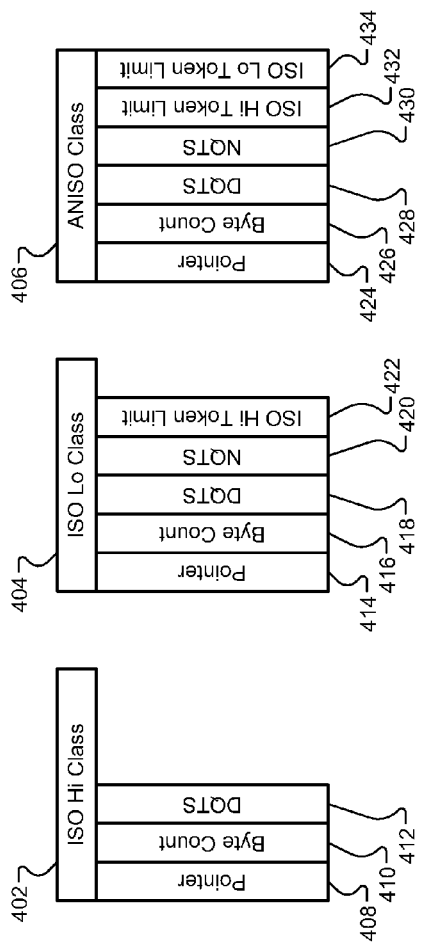
FIG. 4 is a diagram of an exemplary implementation of headers of packets of an isochronous (ISO) high-priority (Hi)

Referring now to FIG. 4, a diagram of an exemplary implementation of headers of packets of an ISO Hi class 402, an ISO Lo class 404, and an ANISO class 406 is shown. The headers of a packet of the ISO Hi class 402 include a pointer 408, a byte count 410 and an DQTS 412 of the packet. The headers of a packet of the ISO Lo class 404 include a pointer 414, a byte count 416, an DQTS 418, a number of QTS (NQTS) 420 and an ISO Hi token limit 422 of the packet.

In another implementation, the headers of a packet of the ISO Lo class 404 include an ISO Hi byte limit (not shown) of the packet instead of the ISO Hi token limit 422. The headers of a packet of the ANISO class 406 include a pointer 424, a byte count 426, an DQTS 428, an NQTS 430, an ISO Hi token limit 432, and an ISO Lo token limit 434 of the packet. In another implementation, the headers of a packet of the ANISO class 404 include an ISO Hi byte limit and an ISO Lo byte limit instead of the ISO Hi and the ISO Lo token limits 432, 434, respectively.

An NQTS of a packet is a number of QTS required to output the packet and is determined based on dividing a byte count of the packet by a predetermined byte count in one QTS interval (e.g., 156.25 bytes per QTS). An ISO Hi token limit of a packet is a maximum token count that is allowed in a leaky bucket of the ISO Hi class when a packet of the ISO Hi class is output. A "leaky bucket," refers to a leaky bucket algorithm, which determines how much data is input to, stored in, and output from a queue. The ISO Hi token limit is determined based on multiplying an NQTS of the packet by a predetermined rate of decrease of the token count per CQTS in the leaky bucket of the ISO Hi class (e.g., 3125 tokens per CQTS). In another implementation, an ISO Hi byte limit of a packet is a maximum byte count that is allowed in the leaky bucket of the ISO Hi class when a packet of the ISO Hi class is output. The ISO Hi byte limit is determined based on multiplying the NQTS of the packet by a predetermined rate of decrease of the byte count per CQTS in the leaky bucket of the ISO Hi class.

An ISO Lo token limit of a packet is a maximum token count that is allowed in a leaky bucket of the ISO Lo class when a packet of the ISO Lo class is output. The ISO Lo token limit is determined based on multiplying an NQTS of the packet by a predetermined rate of decrease of the token count per CQTS in the leaky bucket of the ISO Lo class. In another implementation, an ISO Lo byte limit of a packet is a maximum byte count that is allowed in the leaky bucket of the ISO Lo class when a packet of the ISO Lo class is output. The ISO Lo byte limit is determined based on multiplying the NQTS of the packet by a predetermined rate of decrease of the byte count per CQTS in the leaky bucket of the ISO Lo class. Leaky buckets are implemented in the scheduler module 306 as described herein.

Referring now to FIG. 5, a functional block diagram of an exemplary implementation of the scheduler module 306 is shown. The scheduler module 306 includes a rate shaping module 502 and a jitter shaping module 504. The rate shaping module 502 includes a leaky bucket for each class of packet sequences. For example, the rate shaping module 502 may include an ISO Hi leaky bucket, an ISO Lo leaky bucket, an ANISO leaky bucket, and other leaky buckets.

Each leaky bucket includes a token count or a byte count that is initialized to an empty count. For example, the empty status may be zero and/or zero plus an offset. When the jitter shaping module 504 outputs head packet headers of a particular class, the rate shaping module 502 increases the token count or the byte count of the leaky bucket of the class. For example, when the jitter shaping module 504 outputs output packet headers of the ISO Hi class, the rate shaping module 502 increases the token count or the byte count of the ISO Hi leaky bucket. The token count of the leaky bucket of the class is increased by a token count of the output packet that is determined based on dividing the byte count of the output packet by a predetermined byte-to-token ratio (e.g., 20 bytes per token). In another implementation, the byte count of the leaky bucket of the class is increased by the byte count of the output packet.

At each start of a CQTS interval, the rate shaping module 502 decreases each of the token counts or the byte counts. Each of the token counts is decreased by the rate of decrease of the token count per CQTS in the leaky bucket of the class. In another implementation, each of the byte counts is decreased by the rate of decrease of the byte count per CQTS in the leaky bucket of the class. Each of the token counts or the byte counts may not be decreased below zero.

The jitter shaping module 504 outputs the output packet header when one of the token counts is less than or equal to a low watermark level. The low watermark level is a predetermined token count that is equal to, for example, an empty count or one increment greater than empty (e.g., empty plus an offset of one or more tokens). In other words, after an output packet header of a class is output, the rate shaping module 502 stalls the output of another packet header of the class until the token count of the class is decreased below or to the low watermark level. Accordingly, the rate shaping module 502 prevents "clumping" of output packets, or a decrease in delay of an output packet to the next output packet.

When the token count in the ISO Hi leaky bucket is less than or equal to the low watermark level, the jitter shaping module 504 determines whether the CQTS has exceed the DQTS of the head packet hears of ISO Hi class (i.e. ISO Hi packet headers). When the CQTS is greater than or equal to the DQTS of the head ISO Hi packet header, the jitter shaping module 504 outputs the ISO Hi packet header as the output packet header.

When the token count in the ISO Hi leaky bucket is greater than the low watermark level or when the CQTS has not exceeded the DQTS of the most recent ISO Hi packet header, the jitter shaping module 504 determines whether the token count in the ISO Lo leaky bucket is less than or equal to the low watermark level. Those skilled in the art can appreciate that the low watermark level for the ISO Lo watermark level is not necessarily equivalent to the low watermark level for the ISO Hi low watermark level. When the token count is less than or equal to the low watermark level, the jitter shaping module 504 determines whether the CQTS is greater than or equal to the DQTS of the head packet headers of the ISO Lo class (i.e., ISO Lo packet headers). When the CQTS is greater than or equal to the DQTS, the jitter shaping module 504 determines whether the NQTS of the head ISO Lo packet header is greater than the difference between the DQTS of the head ISO Hi packet header and the CQTS.

When the NQTS of the head ISO Lo packet header is less than or equal to the difference between the DQTS of the head ISO Hi packet header and the CQTS, the jitter shaping module 504 outputs the ISO Lo packet header as the output packet header. Outputting the ISO Lo packet does not result in increased jitter of the head ISO Hi packet. When the NQTS of the head ISO Lo packet header is greater than the difference, the jitter shaping module 504 determines whether the token count in the ISO Hi leaky bucket is less than the ISO Hi token limit of the head ISO Lo packet header. In this case, outputting the head ISO Lo packet may increase jitter by delaying the DQTS of the head ISO Hi packet.

When the token count in the ISO Hi leaky bucket is less than the ISO Hi token limit of the most recent ISO Lo packet header, the jitter shaping module 504 outputs the most recent ISO Hi packet header before its DQTS interval as the output packet header to prevent the increase in jitter. Otherwise, the jitter shaping module 504 outputs the most recent ISO Lo packet header as the output packet header. In this case, outputting the most recent ISO Lo packet does not increases jitter by delaying the DQTS of the most recent ISO Hi packet because the DQTS is already being delayed by the rate shaping module 502.

When the token count in the ISO Lo leaky bucket is greater than the low watermark level or when the CQTS is less than the DQTS of the most recent ISO Lo packet header, the jitter shaping module 504 determines whether the token count in the ANISO leaky bucket is less than or equal to the low watermark level. When the token count is less than or equal to the empty level, the jitter shaping module 504 determines whether the NQTS of the most recent ANISO packet header is greater than the difference between the DQTS of the most recent ISO Hi packet header and the CQTS. When the NQTS is greater than the difference, the jitter shaping module 504 determines whether the token count in the ISO Hi leaky bucket is less than the ISO Hi token limit of the most recent ANISO packet header. In this case, outputting the most recent ANISO packet may increase jitter by delaying the DQTS of the most recent ISO Hi packet. When the token count is less than the ISO Hi token limit of the ANISO packet header, the jitter shaping module 504 outputs the most recent ISO Hi packet header before its DQTS interval as the output packet header to prevent the increase in jitter.

When it is determined that outputting the most recent ANISO packet does not increase jitter by delaying the DQTS of the most recent ISO Hi packet, the jitter shaping module 504 determines whether the NQTS of the most recent ANISO packet header is greater than the difference between the DQTS of the most recent ISO Lo packet header and the CQTS. When the NQTS is greater than the difference, the jitter shaping module 504 determines whether the token count in the ISO Lo leaky bucket is less than ISO Lo token limit of the most recent ANISO packet header. In this case, outputting the most recent ANISO packet may increase jitter by delaying the DOTS of the most recent ISO Lo packet. When the token count is less than the ISO Lo token limit of the ANISO packet header, the jitter shaping module 504 outputs the most recent ISO Lo packet header before its DQTS interval as the output packet header to prevent the increase in jitter. When it is determined that outputting the most recent ANISO packet does not increase jitter by delaying the DQTS of the most recent ISO Lo packet, the jitter shaping module 504 outputs the most recent ANSIO packet header as the output packet header.

The jitter shaping module 504 may determine whether outputting a packet of any lower-priority packet does not increase jitter by delaying a DQTS of any higher-priority packet. When it is determined that outputting a packet of a lower-priority class does increase jitter, the jitter shaping module 504 outputs a packet of a higher-priority class before its DQTS to prevent the increase in jitter. Otherwise, the jitter shaping module 504 outputs a packet of a lower-priority class.

Referring now to FIG. 6, a graph depicting a token count of a leaky bucket of a class of packet sequences versus an CQTS is shown. The token count is initialized to the empty count (e.g. zero plus an offset). When output packet headers of the class are output, the token count is increased by a token count of the output packet (e.g., at the CQTS of 1).

At each start of a CQTS interval (e.g., at the CQTS of 2), the token count is decreased by a rate of decrease of the token count per CQTS in the leaky bucket (i.e., a decrease rate 602). When the token count is less than or equal to an empty level 604 (e.g., during the CQTS interval of 9), the packet headers of the class may be output. In addition, when the token count is less than a token limit 606 (e.g., during the CQTS interval of 3), the packet headers of the class may be output if outputting packet headers of another, lower-priority class would result in more jitter.

Referring now to FIG. 7, a flowchart depicting exemplary steps performed by the scheduler module 306 is shown. Control begins in step 702. In step 704, the token count in the ISO Hi leaky bucket (i.e., ISO Hi tokens) is determined. In step 706, control determines whether the ISO Hi tokens is less than or equal to the low watermark level (e.g., Empty). If true, control continues in step 708. If false, control continues in step 710.

In step 708, control determines whether the CQTS is greater than or equal to the DQTS of the most recent ISO Hi packet header (i.e., ISO Hi DQTS). If true, control continues in step 712. If false, control continues in step 710. In step 712, the most recent ISO Hi packet headers are output. Control returns to step 704.

In step 710, the token count in the ISO Lo leaky bucket (i.e., ISO Lo tokens) is determined. In step 714, control determines whether the ISO Lo tokens is less than or equal to the low watermark level. If true, control continues in step 716. If false, control continues in step 718.

In step 716, control determines whether the CQTS is greater than or equal to the ISO Hi DQTS. If true, control continues in step 720. If false, control continues in step 718. In step 720, control determines whether the NQTS of the most recent ISO La packet header (i.e., ISO Lo NQTS) is greater than the difference between the ISO Hi DQTS and the CQTS. If true, control continues in step 722. If false, control continues in step 724.

In step 722, control determines whether the ISO Hi token count is less than the ISO Hi token limit of the most recent ISO Lo packet header. If true, control continues in step 726. If false, control continues in step 724. In step 724, the most recent ISO Lo packet headers are output. Control returns to step 704. In step 726, the most recent ISO Hi packet headers are output. Control returns to step 704.

In step 718, the token count in the ANISO leaky bucket (i.e., ANISO tokens) is determined. In step 728, control determines whether the ANISO tokens is less than or equal to the empty level. If true, control continues in step 730. If false, control returns to step 704.

In step 730, control determines whether the NQTS of the most recent ANISO packet header (i.e., ANISO NQTS) is greater than the difference between the ISO Hi DQTS and the CQTS. If true, control continues in step 732. If false, control continues in step 734.

In step 732, control determines whether the ISO Hi token count is less than the ISO Hi token limit of the most recent ANISO packet header. If true, control continues in step 736. If false, control continues in step 734. In step 736, the most recent ISO Hi packet header is output. Control returns to step 704.

In step 734, control determines whether the ANISO NQTS is greater than the difference between the ISO Lo DQTS and the CQTS. If true, control continues in step 738. If false, control continues in step 740. In step 738, control determines whether the ISO Lo tokens is less than the ISO La token limit of the most recent ANISO packet header. If true, control continues in step 742. If false, control continues in step 740.

In step 740, the most recent ANISO packet header is output. Control returns to step 704. In step 742, the most recent ISO Lo packet header is output. Control returns to step 704.

Referring now to FIG. 8A, a timing diagram depicting exemplary packet sequences between ports and queues of a network switch of a first hop according to the principles of the prior art is shown. The network switch includes a first port, a second port, a queue control module, an ISO queue, an ANISO queue, and a third port. The first port receives input packets of an ISO class (i.e., ISO input packets).

The queue control module determines an DQTS for each of the ISO input packets before storing the ISO input packets into the ISO queue. The second port receives input packets of an ANISO class (i.e., ANISO input packets). The ANISO input packets are one maximum transmission unit (MTU) in size (i.e., the largest packet that the network switch can receive and transmit).

The queue control module stores the ANISO input packets into the ANISO queue. The third port retrieves the ISO packets from the ISO queue and outputs the ISO packets from an CQTS of 2 to an CQTS of 15. During this time interval, there is no jitter (i.e., the ISO packets are output at ideal, equal time intervals).

At the start of the CQTS of 15, the third port retrieves an ANISO packet from the ANISO queue and outputs the ANISO packet. Output of the ANISO packet delays output of an ISO packet with an DQTS of 17 until an COTS of 22. This results in "dispersion" of output packets, or an increase in delay of an output packet to the next output packet, as seen from the CQTS of 15 to the COTS of 22. Output of the ANISO packet causes clumping of output packets as seen from an CQTS of 22 to an COTS of 25. Both dispersion and clumping of output packets increase jitter.

Referring now to FIG. 8B, a timing diagram depicting exemplary packet sequences between ports and queues of a network switch of a second hop according to the principles of the prior art is shown. The network switch includes a first port, a second port, a queue control module, an ISO queue, an ANISO queue, and a third port. At the start of an CQTS of 22, the third port retrieves an ANISO packet from the ANISO queue and outputs the ANISO packet.

Output of the ANISO packet delays outputting of the ISO packet with the DQTS of 17 from the first hop until an CQTS of 29. In other words, dispersion between output packets is increased in the second hop (i.e., approximately doubled). Accordingly, a worst-case delay between input and output packets is a number of hops multiplied by an MTU time (i.e., a time required to transfer a packet one MTU in size). This jitter is not recoverable and accumulates from hop to hop.

Referring now to FIG. 9A, a timing diagram depicting exemplary packet sequences between ports and queues of a network switch of a first hop according to the principles of the present disclosure is shown. The network switch includes a first port, a second port, a queue control module, an ISO queue, an ANISO queue, and a third port. The queue control module determines an DQTS for each of ISO input packets before storing the ISO input packets into the ISO queue. The queue control module determines the DQTS based on summing an CQTS of when the queue control module receives the ISO input packet and a predetermined QTSD (e.g., one MTU in time).

From an CQTS of 16 to an CQTS of 19 and from an CQTS of 26 to an CQTS of 30, the third port retrieves ISO packets from the ISO queue and outputs the ISO packets before their DQTSs to prevent dispersion that may be caused by outputting ANISO packets. Although outputting the ANISO packets does cause dispersion between the output packets, the dispersion may be decreased in the second hop as described herein. This jitter maybe recovered and does not accumulate from hop to hop.

Referring now to FIG. 9B, a timing diagram depicting exemplary packet sequences between ports and queues of a network switch of a second hop according to the principles of the present disclosure is shown. The network switch includes a first port, a second port, a queue control module, an ISO queue, an ANISO queue, and a third port. The queue control module determines an DQTS for each of ISO input packets before storing the ISO input packets into the ISO queue. The queue control module determines the DQTS based on summing an CQTS of when the queue control module receives the ISO input packet and the predetermined QTSD (e.g., one MTU in time).

From an CQTS of 24 to an CQTS of 27 and from an CQTS of 34 to an CQTS of 37, the third port retrieves ISO packets from the ISO queue and outputs the ISO packets only when a token count of an ISO leaky bucket is less than or equal to a low watermark level. In other words, the third port is stalled in outputting the ISO packets to prevent clumping and decrease dispersion of the ISO packets. Accordingly, a best-case delay between input and output packets is the predetermined QTSD (e.g., one MTU in time).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A network switch, comprising:
a first queue configured to receive a first packet;
a second queue configured to receive a second packet; and
a queue control module configured to
determine a desired output time slot of the first packet based on i) an arrival time of the first packet, and ii) an output rate associated with the first packet,
determine an amount of time required to output the first packet,
determine a length of the second packet,
determine a scheduled output time slot of the second packet based on i) a byte count of the second packet, and ii) an output rate associated with the second packet,
determine a difference between a current time and the scheduled output time slot of the second packet,
determine whether the amount of time required to output the first packet is less than or equal to the difference between the current time and the scheduled output time slot of the second packet, and
selectively output the first packet before the second packet if the amount of time required to output the first packet is less than or equal to the difference between the current time and the scheduled output time slot of the second packet,
wherein the queue control module is configured to i) increase a first token count associated with the first packet by a token count of the first packet when the queue control module outputs the first packet, and ii) increase a second token count associated with the second packet by a token count of the second packet when the queue control module outputs the second packet,
wherein the queue control module is configured to i) output the first packet when the first token count is less than or equal to a first token limit associated with the first packet, and ii) output the second packet when the second token count is less than or equal to a second token limit associated with the second packet, and
wherein the queue control module is configured to:
determine the first token limit based on i) a first output time period of the first packet and ii) the token count per time period associated with the first packet; and
determine the second token limit based on i) a second output time period of the second packet and ii) the token count per time period associated with the second packet.

2. A method for operating a network switch, the method comprising:
receiving a first packet at a first queue;
receiving a second packet at a second queue;
determining a desired output time slot of the first packet based on i) an arrival time of the first packet, and ii) an output rate associated with the first packet;
determining an amount of time required to output the first packet;
determining a length of the second packet;
determining a scheduled output time slot of the second packet based on i) a byte count of the second packet, and ii) an output rate associated with the second packet;
determining a difference between a current time and the scheduled output time slot of the second packet;
determining whether the amount of time required to output the first packet is less than or equal to the difference between the current time and the scheduled output time slot of the second packet,
selectively outputting the first packet before the second packet if the amount of time required to output the first packet is less than or equal to the difference between the current time and the scheduled output time slot of the second packet
increasing a first token count associated with the first packet by a token count of the first packet when the first packet is output;
increasing a second token count associated with the second packet by a token count of the second packet when the second packet is output;
outputting the first packet when the first token count is less than or equal to a first token limit associated with the first packet;
outputting the second packet when the second token count is less than or equal to a second token limit associated with the second packet;
determining the first token limit based on i) a first output time period of the first packet and ii) the token count per time period associated with the first packet; and
determining the second token limit based on i) a second output time period of the second packet and ii) the token count per time period associated with the second packet.

* * * * *